Dec. 14, 1965   M. A. SCHWEIKER   3,222,845
APPARATUS FOR STACKING TILES IN MAGAZINES
Filed Dec. 20, 1962   5 Sheets-Sheet 1
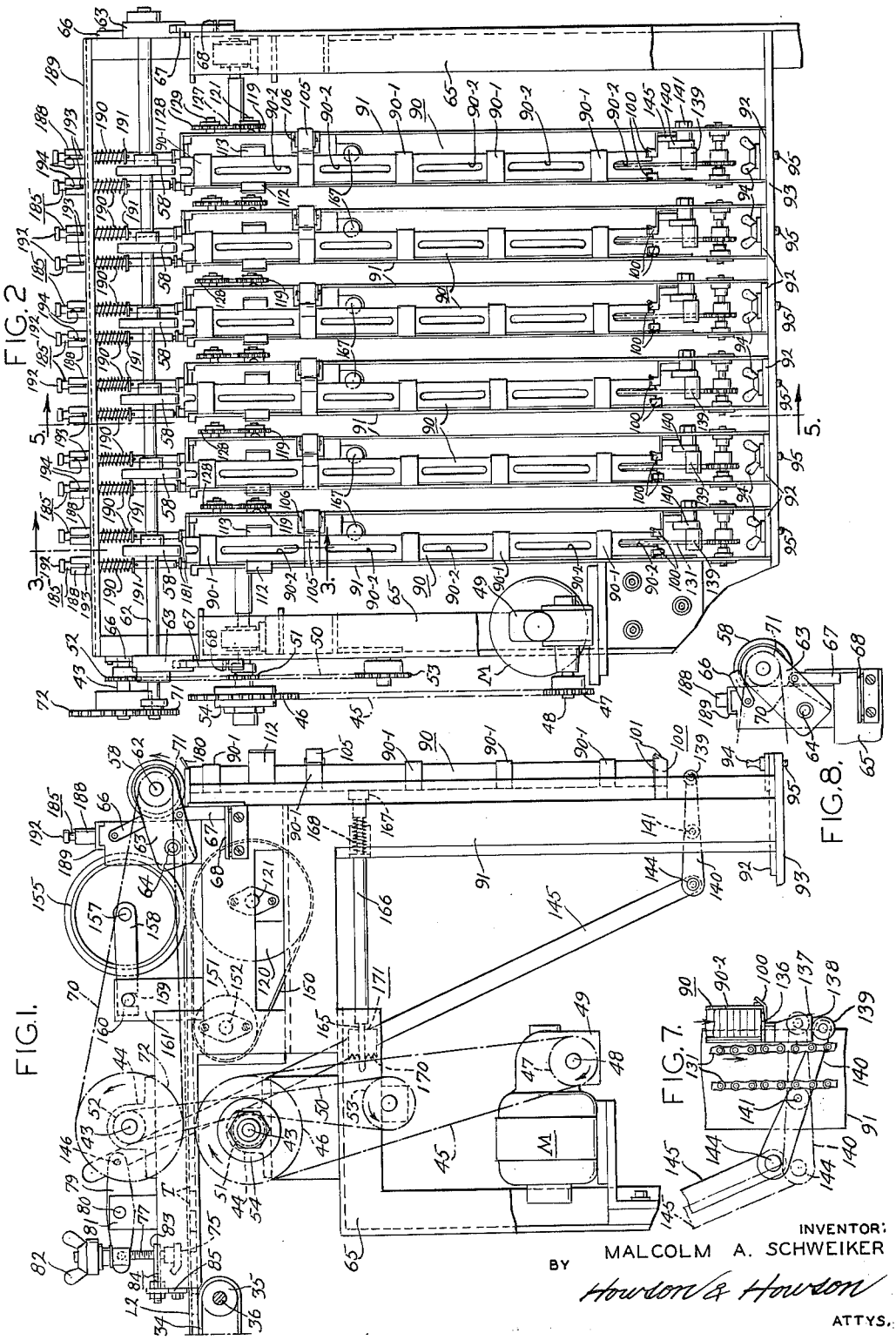
INVENTOR:
MALCOLM A. SCHWEIKER
BY
Howson & Howson
ATTYS.

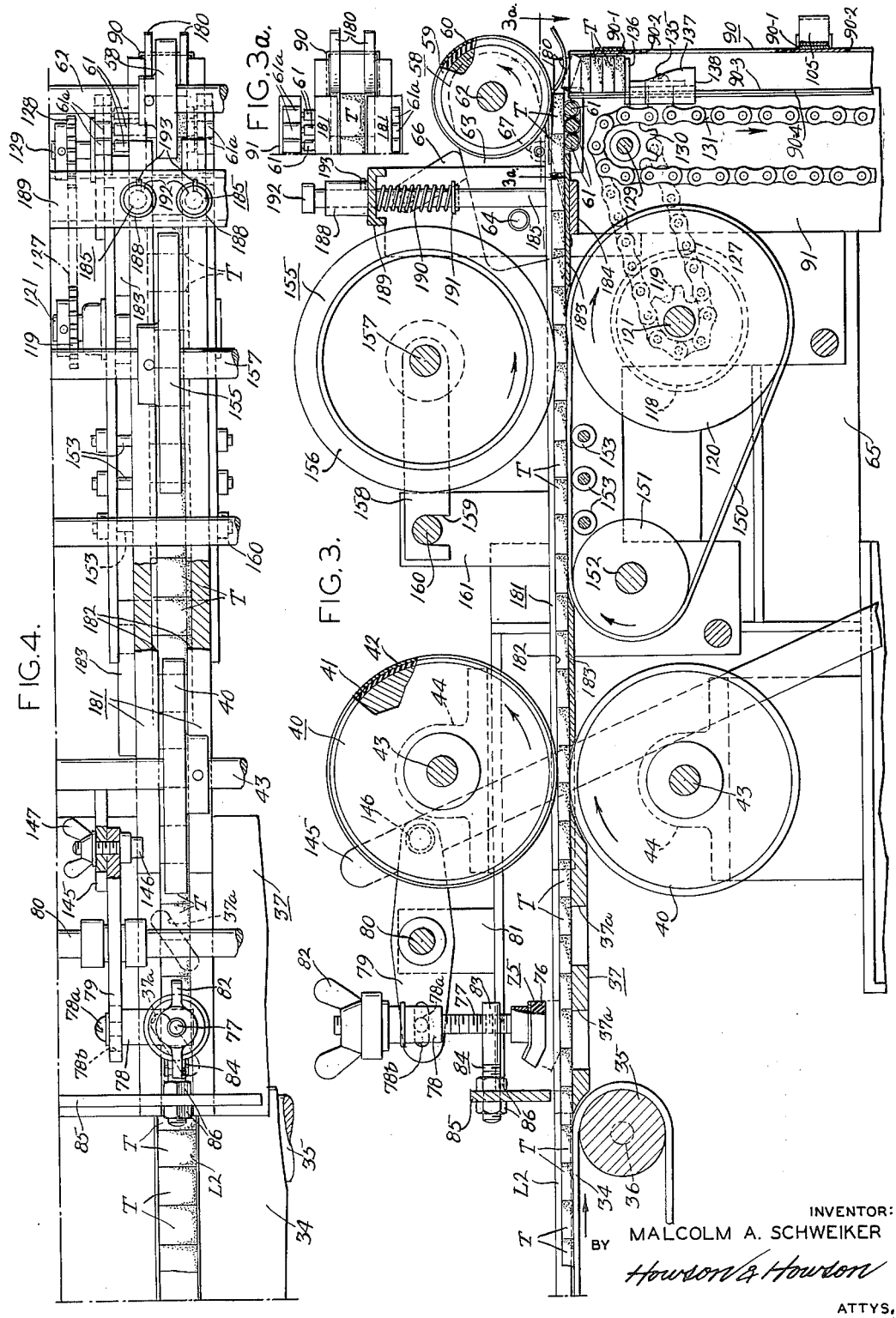

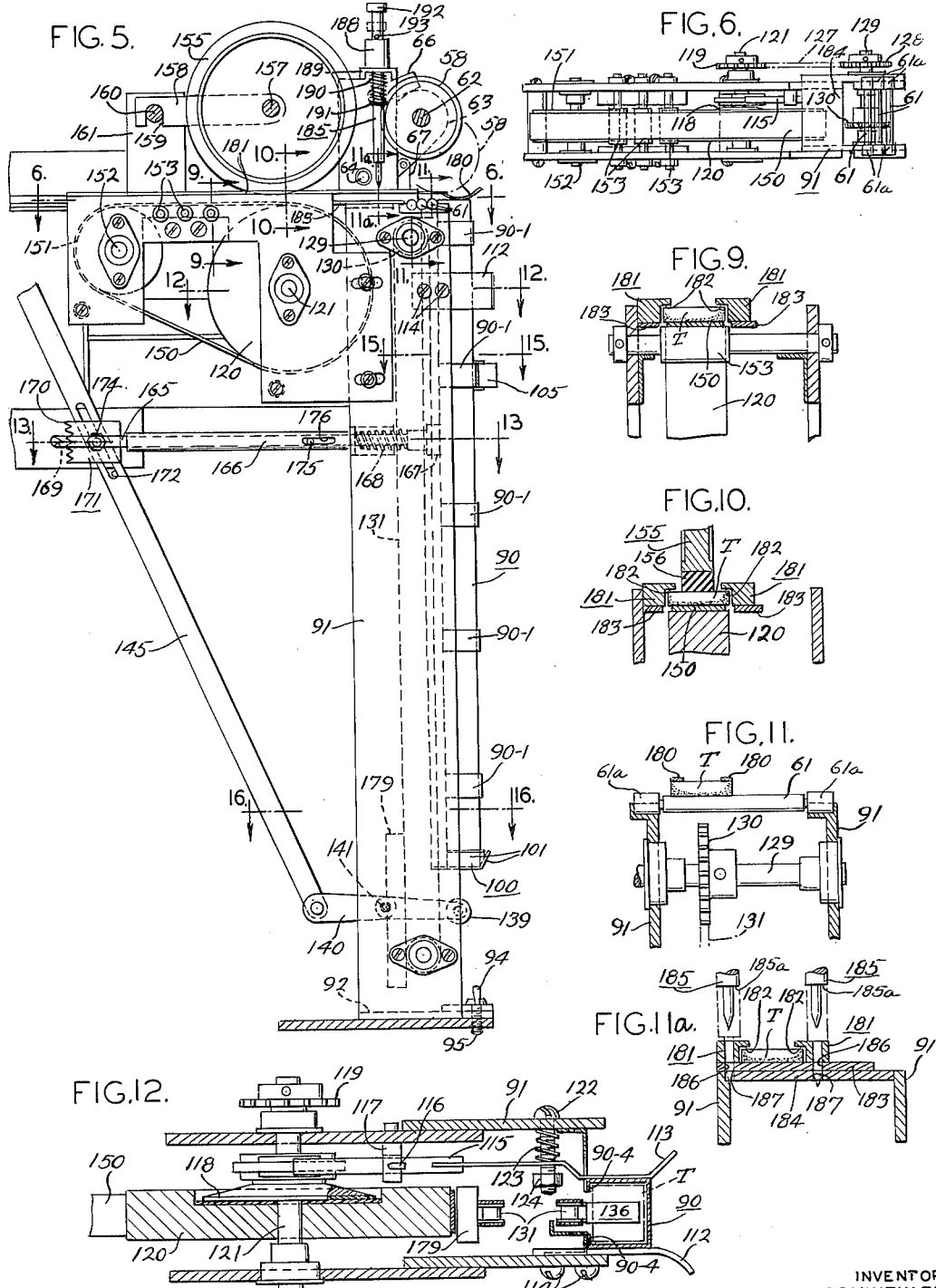

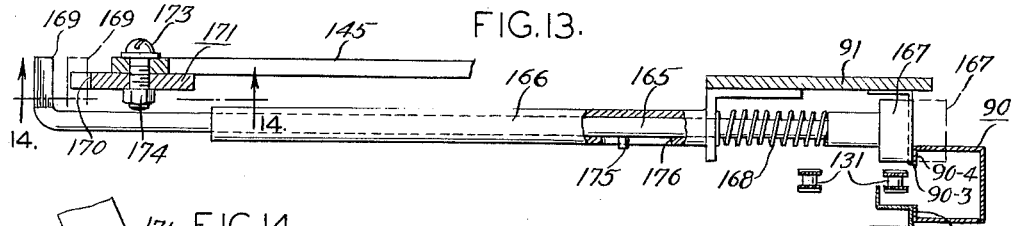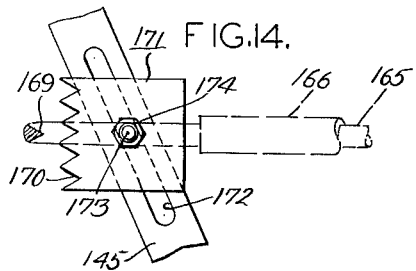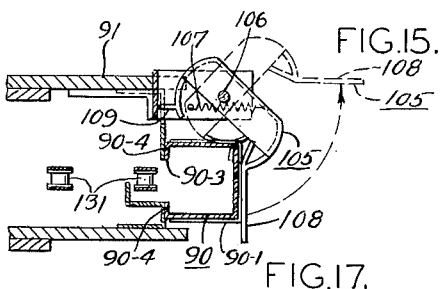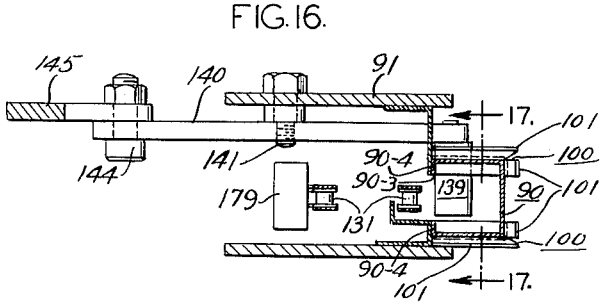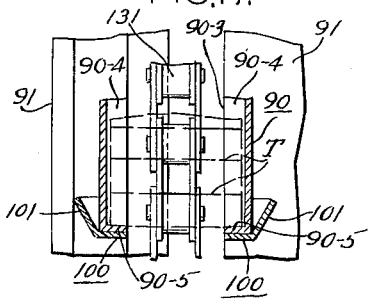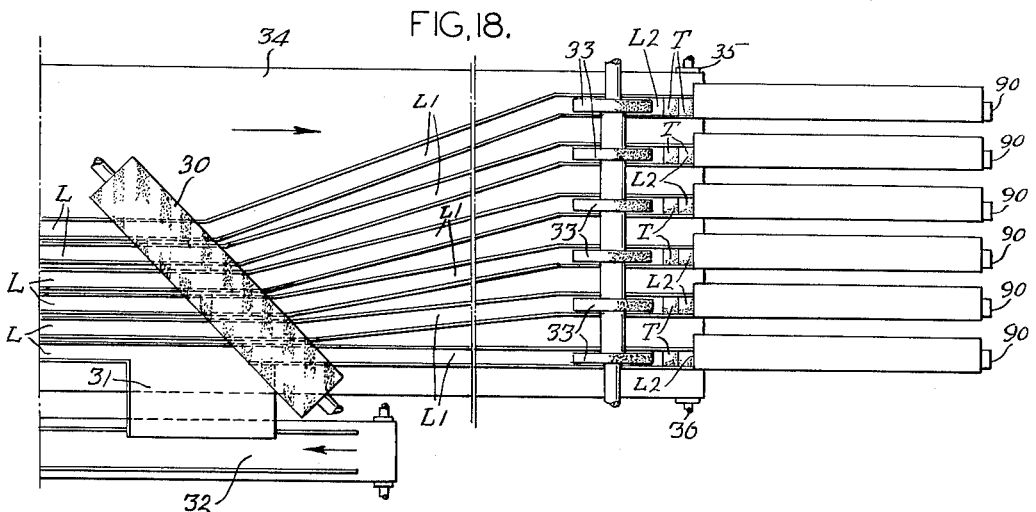

Dec. 14, 1965   M. A. SCHWEIKER   3,222,845
APPARATUS FOR STACKING TILES IN MAGAZINES
Filed Dec. 20, 1962   5 Sheets-Sheet 5

INVENTOR:
MALCOLM A. SCHWEIKER
BY Howson & Howson
ATTYS.

United States Patent Office 3,222,845
Patented Dec. 14, 1965

3,222,845
APPARATUS FOR STACKING TILES
IN MAGAZINES
Malcolm A. Schweiker, Worcester, Pa., assignor to
American Olean Tile Company, Inc., Lansdale, Pa.,
a corporation of New York
Filed Dec. 20, 1962, Ser. No. 246,082
17 Claims. (Cl. 53—245)

This invention relates to apparatus for stacking tiles in tubes or magazines in preparation as for use in tile dispensing and arranging apparatus and the like and has for an object the provision of improvements in this art. While the description is directed specifically to tiles for clarity, it will be understood that it covers other articles of a similar nature which can be handled in a similar way.

The present apparatus can advantageously be used as intermediate equipment which is supplied with tiles in aligned rows by certain tile orienting and cleaning apparatus disclosed in my copending application Serial No. 225,578, filed Sept. 24, 1962, now Patent No. 3,177,568, and which supplies tiles to the tile pattern assembling or arranging apparatus disclosed in my copending application Serial No. 246,081, filed December 20, 1962, now Patent No. 3,162,937.

The present invention provides means for feeding tiles along guideways and dropping them into a magazine or tube and lowering the stack in the tube as the tiles are fed so each tile fed will uniformly drop down a given distance whereby to insure that it will be disposed properly on the stack.

The invention provides improved means for progressively lowering the stack in the magazine in step with the feeding of the tiles.

It also provides improved means for halting the infeed of tiles when a magazine has been filled.

It also provides improved means for holding a magazine.

It also provides means for preventing the feed of tiles when a magazine is not in position to receive them.

It also provides means for adjusting for differences in thickness of different lots of tiles.

It also provides improved means for spreading out a plurality of lines of advancing tiles to the spacing required for charging them into magazines.

It also provides means for quickly removing the magazine holding and charging mechanism from the tile supplying and advancing mechanism to provide for access to and repair of either of the mechanisms.

It also provides means actuated by a line of advancing tiles for controlling the lowering of a stack of tiles.

The objects of the invention as well as various features of novelty and advantages will be apparent from the following description of an exemplary embodiment, reference being made to the accompanying drawings, wherein:

FIG. 1 is a side elevation of apparatus embodying the invention;

FIG. 2 is a front elevation of the apparatus shown in FIG. 1 with certain pressure rolls omitted;

FIG. 3 is an enlarged longitudinal vertical section and elevation taken on the line 3—3 of FIG. 2 with the pressure rolls included;

FIG. 3a is a fragmentary plan view of a detail, the view being taken on the line 3a—3a of FIG. 3;

FIG. 4 is a top plan view of the parts shown in FIG. 3;

FIG. 5 is an enlarged longitudinal vertical section and elevation taken on the line 5—5 of FIG. 2;

FIG. 6 is a plan view taken on the line 6—6 of FIG. 5;

FIG. 7 (on sheet 1) is an enlarged partial side elevation similar to the lower part of FIG. 1 but with the magazine full of tiles;

FIG. 8 (on sheet 1) is a side elevation of parts shown at the top right-hand side of FIG. 1 but in another position;

FIG. 9 is a partial enlarged vertical transverse section taken on the line 9—9 of FIG. 5;

FIG. 10 is a partial enlarged vertical transverse section taken on the line 10—10 of FIG. 5;

FIG. 11 is a partial enlarged vertical transverse section taken on the line 11—11 of FIG. 5;

FIG. 11a is a fragmentary enlarged vertical transverse section taken on the line 11a—11a of FIG. 5;

FIG. 12 is an enlarged horizontal section taken on the line 12—12 of FIG. 5;

FIG. 13 is an enlarged horizontal section taken on the line 13—13 of FIG. 5;

FIG. 14 is a fragmentary vertical longitudinal section taken on the line 14—14 of FIG. 13;

FIG. 15 is an enlarged fragmentary horizontal section taken on the line 15—15 of FIG. 5;

FIG. 16 is an enlarged fragmentary horizontal section taken on the line 16—16 of FIG. 5;

FIG. 17 is a vertical transverse section taken on the line 17—17 of FIG. 16;

FIG. 18 is a top plan view of apparatus for feeding a plurality of rows of tiles to the magazine filling apparatus disclosed herein;

Figure 19:
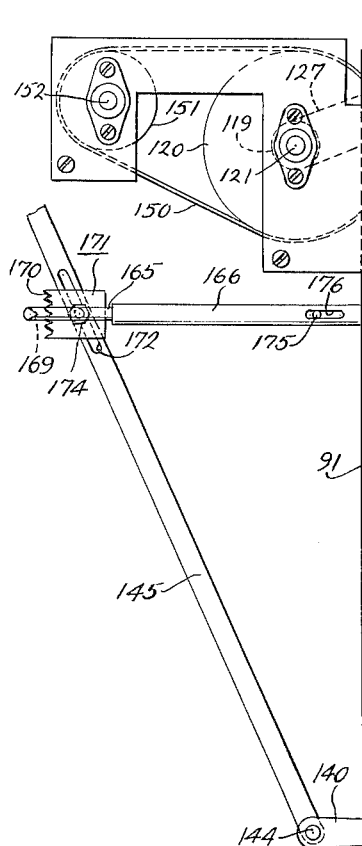
FIG. 19 is a side elevation of a detached magazine holding and filling unit.
Figure 20:
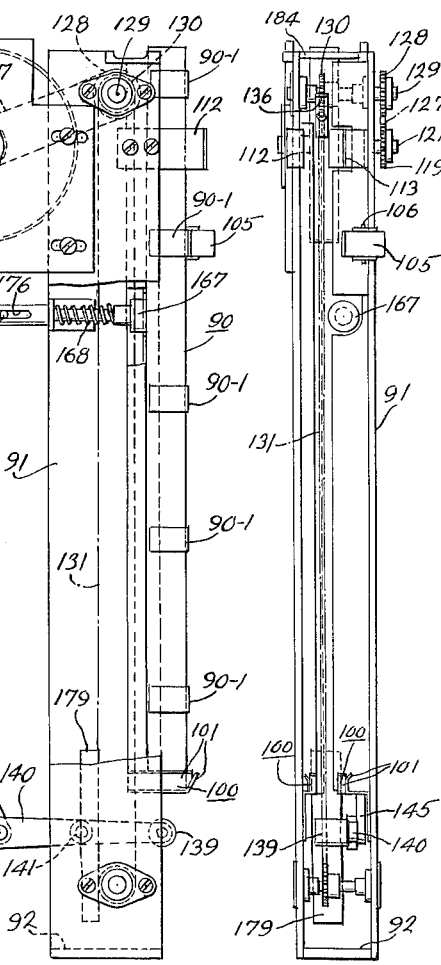
FIG. 20 is a front elevation of the unit shown in FIG. 19, the magazine being removed.

According to the present invention, tiles are fed in one or more rows by a driven supporting belt to a corresponding number of guideways along which they are pushed by advancing tiles behind them to positive drive rolls which feed them forward along the guideways to drop off one-by-one into one or more stack-holding tubes or magazines. For each row a power driven roll at the end of the guideway pushes each tile forward away from the next tile in the line to assure full separation and to feed out the first tile into the magazine. The row of advancing tiles drives a stack lowering elevator which causes the stack to descend as tiles are added at the top, the actions being so coordinated and adjusted that the top tile drops approximately the same distance each time. When a magazine is filled it applies a brake upon the advancing line of tiles ahead (upstream of the tile flow) of the positive feed means so that only the one tile which is engaged by the positive feed rolls is fed forward to push one more tile out on the stack before the magazine is removed.

A magazine is removed by swinging it out at the upper end and an interlock is provided for locking the tile line in braked position until a new magazine has been inserted. The stack elevator meantime, being counterweighted and released from its down-driving means, can return to its upper position ready for holding tiles at the top of the next magazine which is inserted. Then when the new empty magazine is inserted it reconnects the elevator with its lowering means and disengages the brake from the line of tiles.

The entire magazine holding and feeding unit for each row of tiles is removable, the forward tile feed roll being liftable out of the way and the forward portion of the tile guide being removable to permit the holding and feeding unit to be removed.

This gives a general idea of the main functions performed. Details will be discussed as the specific description proceeds.

Referring first to FIG. 18, there is shown an arrangement which is somewhat like that shown in the earlier one of my copending applications referred to in which a plurality of rows or lines L (six as shown) of advancing tiles T are engaged by an angularly arranged brush 30 which cleans them on top and sweeps off any extra tiles down an inclined apron 31 to a return conveyor belt 32.

The tiles of the closely spaced parallel lines L are spread out along divergent lines L1 into more widely spaced parallel lines L2 whereby to accommodate the width of the magazines in which the tiles are to be stacked together with the needed mechanisms associated therewith. Rotating brushes 33 aid in arranging the tiles in their guides and in seating the tiles down flat on their supporting and conveying surface which comprises a travelling belt 34 passing over pulleys 35 carried by shafts 36, the front one of which is shown in FIG. 18.

As shown in FIG. 3, the tiles are frictionally pushed by the belt 34 along the guideways L2 until they reach positive forward feed means in the form of driven gripper rolls 40. Between the forward end of belt 34 and the rolls 40 the tiles are supported on a fixed bridge plate 37 having narrow slotted openings 37a for scrap material to drop out. The rolls 40 are covered on the surface by resilient elastic friction means such as an inner layer 41 of sponge rubber and an outer layer 42 of neoprene. The rolls are mounted on shafts 43 carried in bearing supports 44.

As shown in FIGS. 1 and 2, the shaft 43 of the lower rolls 40 has a sprocket 46 driven by a sprocket chain 45 from a sprocket 47 of a shaft 48 of a reduction gear unit 49 driven by a motor M. The shaft 43 of the upper roll 40 is driven from the shaft of the lower roll by a chain 50 passing over sprockets 51, 52 of the lower and upper roll shafts, respectively, and over an idler sprocket 53. In order to avoid damage, the drive from sprocket 46 of the lower shaft 43 is through an adjustable friction clutch device 54.

At the forward end of a guideway L2 the tiles are driven forward at a faster speed to cause separation by a roll 58, having (FIG. 3) a sponge rubber covering 59 and an outer neoprene covering 60, the roll 58 holding the tiles down under pressure against supporting rolls 61 carried in bearing elements 61a which, with the rolls 61, are removable. All of the rolls 58 are mounted on a shaft 62 which is supported at its ends on vertically swingable arms 63 supported on pivots 64 carried by a main frame 65. The rolls 58 swing up for the purpose of permitting the removal of the forward portion of the tile guides, as will be described.

As shown in FIGS. 3 and 8, the arms 63 are held down by swingable dogs or wedge latches 66 and are limited in downward movement by swingable dogs or stop legs 67 which engage fixed brackets 68.

The shaft 62 is driven from the upper gripper roll shaft 43 by a sprocket chain 70 passing over sprockets 71 and 72 on the shafts 62 and 43 respectively.

Means are provided for halting the movement of the advancing lines of tiles at a point ahead of the place where they are engaged by the positive driving rolls 40, that is, where they are only frictionally driven by the belt 34. The means here shown comprises for each row a vertically movable brake shoe 75 having a rubber lining 76 adapted to be brought down on the tiles against the bridge plate 37. The shoe 75 is mounted on a vertically adjustable rod 77 threaded in an arm 78 which is secured, as by a screw 78a in a slot 78b, on one end of a lever 79 pivoted on a transverse shaft 80. The shaft 80 at its ends is carried by upstanding supports 81 secured on the main frame 65. A wing nut 82 locks the rod 77 in adjusted positions.

The rod 77 is guided and its forward reaction is taken by a guide 83 of a threaded stem 84 mounted in a transverse bar 85 carried by the main frame, the stem 84 being held in adjusted positions by lock nuts 86. The means for operating the levers 79 and brake shoes 75 will be described hereinafter.

At the front end of each tile guideway, means are provided for removably supporting a tube or magazine 90 (FIGS. 1 and 2) for receiving a stack of tiles, say ninety-six (96) tiles to be compatible with other apparatus with which a magazine is adapted to cooperate. The magazine supporting means includes a column 91 which is secured to the main frame 65 at its upper end and which has a base 92 at its lower end which rests on a frame cross bar 93 and is quickly secured in place by a screw 95 having an integral wing nut 94.

Figures 24, 25:
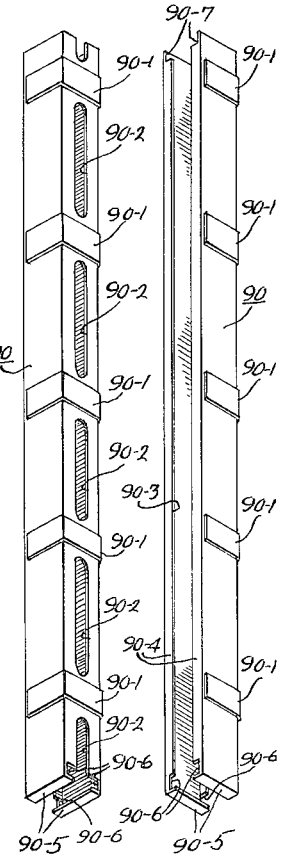
FIG. 24 is a front perspective view of a tile holding tube or magazine.
FIG. 25 is a rear perspective view of the magazine.

A tile stack container tube or magazine 90 alone is shown in FIGS. 24 and 25, the front with spaced bands 90.1 and sight slots 90.2 being shown in FIG. 24 and the back with a continuous slot 90.3 between inturned tile retaining flanges 90.4 being shown in FIG. 25. Both views show inturned tile supporting base flanges 90.5 and front and back tile dispensing slots 90.6. FIG. 25 shows a tile infeed slot 90.7 at the top.

As shown in FIGS. 5, 16 and 17, the column 91 near the lower end carries brackets 100 with inwardly and downwardly sloping flanges 101 on which the bottom of a magazine 90 rests. The magazine is inserted by first seating its bottom end on the brackets 100 and then swinging its upper end inward toward the column 91.

As shown in FIGS. 5 and 15, a latch 105 near the upper end of the magazine swings over on its hinge pin 106 under the action of an over-center spring 107 to hold the magazine by its arm 108. The latch has another shorter arm 109 which, when the latch is open, stands in the path of the magazine so that the latch is closed by the insertion of a magazine. It is opened when the magazine is pulled out.

At a higher level, as shown in FIGS. 5 and 12, the support 91 carried spring clips 112 and 113 which embrace the sides of a magazine when it is inserted. The clip 112 is fixed in position, as by screws 114, but the other clip 113 is secured to a clutch lever 115 which is pivoted on a pin 116 carried by a fixed post 117. The rear end of the lever 115 is operatively connected with a clutch plate 118 which serves to engage and disengage a sprocket 119 with a pulley 120, both operatively associated with a shaft 121, one being fixed and one being turnable thereon. It is convenient to fix the sprocket to the shaft, mount the pulley loosely on the shaft, and spline the clutch plate on the shaft. The clip 113 has a hole which receives a bolt 122 carrying a spring 123 which urges the clip 113 toward the fixed clip 112 whereby the clip 113 and the clutch lever are operated when a magazine is moved in and out, the clutch being engaged when a magazine is inserted and disengaged when the magazine is removed. A nut 124 on the bolt 122 holds the parts in proper position.

As best shown in FIG. 3, the sprocket 119 on shaft 121 is connected by a sprocket chain 127 and a sprocket 128 on a shaft 129 to drive a sprocket 130 on which an elevator chain 131 is mounted.

Figure 21:
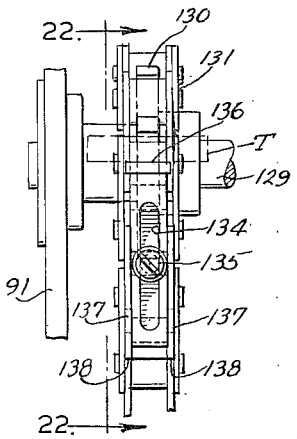
FIG. 21 is a fragmentary enlarged front elevation of parts shown near the top of FIG. 20.
Figure 22:
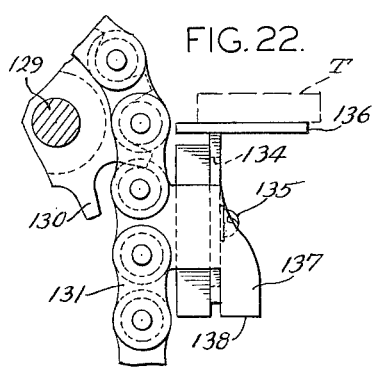
FIG. 22 is a side elevation and section taken on the line 22—22 of FIG. 21.
Figure 23:
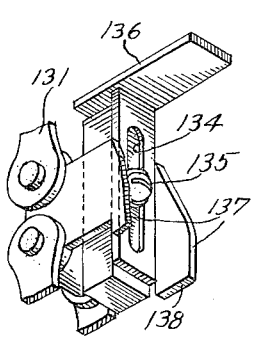
FIG. 23 is a perspective of parts shown in FIGS. 21 and 22.

The chain 131 on its front span (FIGS. 21–23) has adjustably secured thereon, as by a slot 134 and screw 135, an elevator plate tile support 136 which is adapted to enter the magazine through its rear slot 90.3 and support a stack of tiles therein. The adjustment accommodates for the cumulative effects of slight variations in tile thickness which are hard to avoid in manufacture. The main concern is to have a given number of tiles in a stack and to avoid too great a drop of the later fed tiles if they are too thin.

As shown in FIG. 7, the lower end of a member 137 on the chain which adjustably carries the tile supporting plate 136 carries on its lower end an abutment 138 which, when the magazine is full, engages a roller 139 of a lever 140 which is mounted on a pivot pin 141 and pushes the outer end of the lever 140 down and its inner end up.

To the other end of the lever 140 there is connected, as by a pivot pin 144, a brake operating link 145 which, at its upper end is connected (FIG. 4), as by a pivot bolt 146 and a wing nut 147, to an end of the brake operating lever 79 already described.

Returning to a consideration of the pulley 120 which was previously described, it is seen (FIG. 3) that it carries a belt 150 which also passes over a pulley 151 carried on a shaft 152. The belt 150 on its upper span is also supported by rollers 153 so as to support a line of tiles passing thereover. The passage of the line of tiles over the belt 150 drives the top span of the belt in a forward direction.

To aid in this action, an idler roll 155 of desired weight and having a resilient rubber rim 156 riding on a row of tiles slightly behind the high point or crown of the pulley, is mounted on a transverse shaft 157. At its ends the shaft 157 is mounted in swing arms 158 which are turnably mounted, as by notches 159, on a transverse rod or shaft 160 carried by fixed frame brackets 161. By this arrangement, the weighting rolls 155 can be readily removed and exchanged. The offset pulley and roll crown arrangement aids in the drive of the belt 150 by the row of tiles. FIG. 3 shows how the line of tiles is pushed down by a roll 155 for offsetting the line locally ahead of the pulley 120 to give the tiles a better grip to drive the belt 150.

Means are provided for holding the brake shoe 75 down on the tiles when a loaded magazine is removed and for continuing to hold it down until another magazine is inserted. The means herein provided, as shown in FIGS. 1, 5, 13, 14 and 19, comprises a plunger 165 slidable in a horizontal guide 166 and having a head 167 which is engaged by one side of the rear of a magazine 90 (FIG. 13), clear the rear slot 90.3, when the top of the new magazine is swung back into latched operating position. The plunger is urged forwardly by a spring 168.

At its rear end the plunger 165 is provided with a laterally bent detent projection 169 which, when moved forward, engages the rear notched edge 170 of a detent plate 171 which is guided along a slot 172 of the brake operating link 145 and adapted to be secured at selected adjustment locations along the slot, as by a clamp bolt 173 and nut 174. The plunger 165 is limited in its movements by a pin or screw 175 in the side operating in a slot 176 of the guide 166.

The operation of the mechanisms associated with the magazines will now be clear. When a magazine is loaded (FIG. 7) the abutment 138 carried by the front span of the elevator chain 131 will engage the roller 139 of the lever 140 and push the front end of the lever down, as shown in full lines in FIG. 7. This pushes up the rear end of the lever which raises the brake operating link 145 and applies the brake 75 to a line of tiles. The detent plate 171, which is clamped to the link 145, rises with it.

Now when the upper end of the magazine 90 is pulled out, as it must be to remove the container, the plunger 165 will be released and will move forward to engage the detent 169 with a notch of the plate 171 to hold the plate and its link 145 in the upper braking position where they are being held by the weight of the magazine.

At the same time, the removal of a magazine releases the spring clip 113 of the clutch lever 115 (FIG. 12) and disengages the connection between the sprocket 119 and the pulley 120. The pulley is held by the now-halted line of tiles on its belt 150 but the sprocket 119 and related parts are released for free movement. The rear span of the elevator chain 131 (FIG. 5) carries a weight 179 which overbalances the weight of the tile supporting plate 136 and its related mounting parts, hence as soon as the magazine with a stack of tiles has been swung forward at the top and then lifted off the bottom support brackets 100, the weight 179 will move down and the elevator plate 136 will move up into position to begin receiving tiles of another stack of a new magazine when it is inserted. The top position of the elevator plate may be defined by any suitable stop means at the top of its movement since it is vertically adjustable to compensate for stacks of different height formed by an equal number of tiles of different thicknesses.

As shown in FIGS. 3 and 3a, bent spring fingers 180 secured to the tile guideway are provided for urging the tiles down upon the stack in a magazine as they are pushed out from the front end of the guideway.

A new magazine is introduced by inserting its lower end in the brackets 100 and then swinging its upper end inward until it is engaged and held by the latch 105. Simultaneously, the inward movement of the magazine will cause the plunger detent 169 to release the detent plate 171 and link 145 and cause the clip 113 to re-engage the clutch plate 118 and re-connect the elevator chain 131 with the tile driven belt 150. When the brake link 145 is released from its detent holding means it will move down, the action on the front end of the lever 140 having been removed, and the brake shoe 75 will be released from the row of tiles. The tiles will now move forward and be fed into the magazine, as before.

As shown in FIGS. 9, 10 and 11a, the guides 181 for the sides of the advancing row of tiles are provided with overhanging flanges 182 which hold the tiles down in operative position. As shown in FIGS. 5 and 11, the top confinement is continued in the spring fingers 180.

The sub-assembly shown in FIG. 19 is insertable and removable for each line of tiles and each magazine feed mechanism provided. FIG. 1 shows one of the units in assembled position in the machine and FIG. 2 shows several of the units in place, as viewed from the front. It has already been explained how the shaft 62 with the driven tile feed-out rolls 58 is moved up out of the way to allow sub-assembly units to be removed; also how the wing nut 94 with the base anchor screw 95 is removed to free the lower end of a unit for removal.

At the top, as shown in FIGS. 2, 3, 4, 5, and 11a, latch pins 185 are provided for entry into aligned holes 186 of parts on the main frame and holes 187 of a removable unit. The pins are slidable in guides 188 carried by a transverse bar 189 secured at its ends on the main frame. Springs 190 disposed below the bar 189 and acting against washers 191 secured on the pins, urge them downwardly. Heads 192 on the pins provide means for pulling them up. A transverse pin 193 secured in a pin 185 is selectively positioned in slots 194 in the guides 188 when the pin is down; or on the top surface of a guide (by turning the pin 185) when the pin 185 is held up in raised position. The upper end of link 145 is disconnected and the link pulled down in removing a unit; or the link 145 may be disconnected at the lower end.

As shown in FIGS. 3 and 4, the side guides 181 for the front end of a row of tiles extend back only to a point above and behind the front end of the fixed plate 37 to provide for their removal. The side guides 181 are secured together behind and ahead of the top span of belt 150 by cross plates 183 which support the tiles here. The front cross plate 183 rests on a cross bar 184 at the upper end of the column 91. It will be noted in FIGS. 2 and 11a that one of the pins, 185 when in its lower position, has a shoulder 185a resting on top of one of the side guides 181 to hold it down by spring pressure.

Before the assembly for holding a magazine is removed the front tile guide unit 181, 183, 184 is removed by pulling it out at the front, the roll 58 first being raised, the pins 185 being raised, and the pressure roll 155 being removed or raised.

The operation of the machine will be apparent from the foregoing description. Considering a single line L2 of tiles, it will be fed forward frictionally by a belt 34 toward the positive feed rolls 40 but the brake shoe 75 which is located ahead of the feed rolls 40 can be brought down on the advancing row to stop the forward movement. It is brought down to stop the supply of tiles when a magazine has been filled.

Beyond the positive feed rolls 40—downstream from the rolls, it may be expressed—the advancing row of tiles passing over the belt 150 and, being held down by a roll 155, drives the elevator chain 131 to lower the elevator plate 136 by the thickness of a tile each time the length of a tile passes along the guide over and with the belt 150.

At the front end the fast turning roll 58 pulls tiles forward one-by-one from the line and feeds them out beneath the spring fingers 180 to drop down on the stack.

The exchange of a filled magazine for an empty magazine and the automatic control actions affected thereby have already been explained; also the removal of a subassembly unit has been explained.

It is thus seen that the apparatus provides convenient and efficient means for feeding and stacking tiles in magazines for subsequent use. The removal of the magazine is quickly effected. The removal of a magazine automatically stops the feed of tiles and disconnects the elevator; then when a new magazine is inserted it automatically re-establishes normal operating conditions. Also the magazine holding assembly is quickly removable for quick replacement so that there is very little down time if this unit is broken, jammed or otherwise out of order.

While one embodiment has been described in detail for purposes of illustration, is is to be understood that there may be various embodiments and modifications within the general scope of the invention.

I claim:

1. Apparatus for feeding and stacking tiles and the like articles, comprising in combination, means for supplying a line of tiles end-to-end to a first feed point, a first tile feed means at said first feed point for positively and continuously feeding forward tiles arriving thereat to a second feed point, a second tile feed means at said second feed point for positively and continuously feeding out tiles arriving thereat to a stack, stack holding means for receiving tiles fed out by said second tile feed means, said second tile feed means moving tiles at a faster rate than the line of tiles arriving thereat is moving whereby to move tiles out one-by-one to the stack holding means, means for moving said stack holding means down as tiles are fed thereto, means upstream of said first feed means for halting the movement of the line of tiles to said first feed point, and means responsive to said stack holding means for operating said tile line halting means to halt the movement of tiles to said first feed point when said stack holding means reaches a predetermined lowered position.

2. Apparatus for feeding and stacking tiles and the like articles, comprising in combination, means for supplying a line of tiles end-to-end to a first feed point, a first tile feed means at said first feed point for positively and continuously feeding forward tiles arriving thereat to a second feed point, a second tile feed means at said second feed point for positively and continuously feeding out tiles arriving thereat to a stack, stack holding means for receiving tiles fed out by said second tile feed means, said second tile feed means moving tiles at a faster rate than the line of tiles arriving thereat is moving whereby to move tiles out one-by-one to the stack holding means, means for moving said stack holding means down as tiles are fed thereto, and means driven by the line of tiles moving from said first feed point to said second feed point for operating said means for moving said stack holding means down.

3. Apparatus for feeding and stacking tiles and the like articles, comprising in combination, means for supplying a line of tiles end-to-end to a first feed point, a first tile feed means at said first feed point for positively and continuously feeding forward tiles arriving thereat to a second feed point, a second tile feed means at said second feed point for positively and continuously feeding out tiles arriving thereat to a stack, stack holding means for receiving tiles fed out by said second tile feed means, said second tile feed means moving tiles at a faster rate than the line of tiles arriving thereat is moving whereby to move tiles out one-by-one to the stack holding means, means for moving said stack holding means down as tiles are fed thereto, and means driven by the line of tiles moving from said first feed point to said second feed point for operating said means for moving said stack holding means down, said means driven by said line of tiles comprising a belt engaging the line of tiles, and means pressing the tiles against the belt to cause the tiles to drive the belt.

4. Apparatus for feeding and stacking tiles and the like particles, comprising in combination, means for supplying a line of tiles end-to-end to a first feed point, a first tile feed means at said first feed point for positively and continuously feeding forward tiles arriving thereat to a second feed point, a second tile feed means at said second feed point for positively and continuously feeding out tiles arriving thereat to a stack, stack holding means for receiving tiles fed out by said second tile feed means, said second tile feed means moving tiles at a faster rate than the line of tiles arriving thereat is moving whereby to move tiles out one-by-one to the stack holding means, means for moving said stack holding means down as tiles are fed thereto, and means driven by the line of tiles moving from said first feed point to said second feed point for operating said means for moving said stack holding means down, said means driven by said line of tiles comprising a belt mounted on spaced pulleys disposed beneath and supporting a part of said line of tiles, and a pressure roll bearing on the line of tiles slightly upstream of the crown of the downstream pulley for causing the tiles to drive the belt.

5. Apparatus for feeding and stacking tiles and the like articles, comprising in combination, means for positively feeding forward and retainably guiding a line of tiles in end-to-end relationship, a movable drive member drivingly engaged with the moving line of tiles and driven solely by and with the line of moving tiles, an elevator and a tile support thereon disposed at the forward end of the line of tiles and receiving tiles in a stack thereon as fed out from the forward end of the line, and coordinated drive means between said movable drive member and said elevator for moving the elevator and the tile support and the stack of tiles thereon vertically by approximately the thickness of a tile each time a tile length of said line moves past said drive member.

6. Apparatus for feeding and stacking tiles and the like articles, comprising in combination, means for positively feeding forward and retainably guiding a line of tiles in end-to-end relationship, a movable drive member drivingly engaged with the moving line of tiles and driven solely by and with the line of moving tiles, an elevator and a tile support thereon disposed at the forward end of the line of tiles and receiving tiles in a stack thereon as fed out from the forward end of the line, and coordinated drive means between said movable drive member and said elevator for moving the elevator and the tile support and the stack of tiles thereon vertically by approximately the thickness of a tile each time a tile length of said line moves past said drive member, a tile magazine removably mounted on a magazine support at said elevator, means for engaging and disengaging the drive means between said drive member and said elevator, and operating means actuated by the removal and replacement of said tile magazine for respectively disengaging and reengaging said drive means.

7. Apparatus for feeding and stacking tiles and the like articles, comprising in combination, means for positively feeding forward and retainably guiding a line of tiles in end-to-end relationship, a movable drive member drivingly engaged with the moving line of tiles and driven solely by and with the line of moving tiles, an elevator and a tile support thereon disposed at the forward end of the line of tiles and receiving tiles in a stack thereon as fed out from the forward end of the line, and coordinated drive means between said movable drive member and said elevator for moving the elevator and the tile support and the stack of tiles thereon vertically by approximately the thickness of a tile each time a tile length of said line moves past said drive member, a tile magazine removably mounted on a magazine support at said elevator, stop means located upstream ahead of said means for positively feeding the line of tiles for halting the movement of tiles to said line feeding means, means operated by said elevator at a predetermined lowered position for operating said stop means to halt the movement of tiles to said line feeding means, and means responsive to the removal of the tile magazine from said magazine support for holding said stop means in the tile halting position and releasing the stop means when a tile support is placed on said magazine support.

8. Apparatus for feeding and stacking tiles and the like articles, comprising in combination, means for positively feeding forward and retainably guiding a line of tiles in end-to-end relationship, a movable drive member drivingly engaged with the moving line of tiles and driven solely by and with the line of moving tiles, an elevator and a tile support thereon disposed at the forward end of the line of tiles and receiving tiles in a stack thereon as fed out from the forward end of the line, and coordinated drive means between said movable drive member and said elevator for moving the elevator and the tile support and the stack of tiles thereon vertically by approximately the thickness of a tile each time a tile length of said line moves past said drive member, a tile magazine removably mounted on a magazine support at said elevator, means for engaging and disengaging the drive means between said drive member and said elevator, and operating means actuated by the removal and replacement of said tile magazine for respectively disengaging and reengaging said drive means, stop means located upstream ahead of said line feed means for halting the movement of tiles to said line feed means, means operated by said elevator at a predetermined lowered position for operating said stop means to halt the movement of tiles to said line feed means, and means responsive to the removal of the tile magazine from said magazine support for holding said stop means in the tile halting position and releasing the stop means when a tile magazine is placed on said magazine support.

9. Apparatus as set forth in claim 8, in which the stop operating means actuated by said elevator includes a movable link, and in which the means responsive to the removal of the magazine comprises a detent rod cooperating with means on said link to hold it in position when the magazine is removed.

10. Apparatus for feeding and stacking tiles and the like articles, comprising in combination, means for positively feeding forward and retainably guiding a line of tiles in end-to-end relationship, a movable drive member drivingly engaged with the moving line of tiles and driven solely by and with the line of moving tiles, an elevator and a tile support thereon disposed at the forward end of the line of tiles and receiving tiles in a stack thereon as fed out from the forward end of the line, and coordinated drive means between said movable drive member and said elevator for moving the elevator and the tile support and the stack of tiles thereon vertically by approximately the thickness of a tile each time a tile length of said line moves past said drive member, said drive member driven by said line of tiles comprising a tile supporting belt carried on pulleys on spaced shafts, a clutch on one of said shafts, a drive connection for moving said elevator controlled by said clutch, a brake for the line of tiles ahead of said tile line feed means, means operated by said elevator for applying said brake at a given stack height, an insertable and removable magazine for receiving a stack of tiles on said elevator, means actuated by said magazine for engaging said clutch when the magazine is inserted and for disengaging it when the magazine is removed, and means actuated upon the removal of said magazine for holding said brake applied independently of the elevator and for releasing the brake when a magazine is inserted after the elevator has ascended to receive a new stack.

11. Apparatus as set forth in claim 10, further characterized by the fact that said magazine is insertable by first seating its lower end on a support and then swinging its upper end inward, and means for holding the magazine in its inward position.

12. Apparatus for feeding and stacking tiles, comprising in combination, a main frame having a first tile line feed means for positively feeding forward and retainably guiding a line of tiles, a second tile line feed means on the main frame for feeding off tiles one-by-one from the front end of the line of tiles at a faster rate than the line is moving and stacking them, a removable sub-assembly frame, elevator means for a stack of tiles fed from said line carried by said sub-assembly frame, means on said sub-assembly frame for holding a removable magazine for taking a stack of tiles on said elevator means, and a drive member carried by said sub-assembly which is positively engaged with and driven by said line of tiles operatively connected to driven means on said removable sub-assembly.

13. Apparatus as set forth in claim 12, in which the member which is driven by said line of tiles is provided with drive connections selectively connecting it to operate said elevator in a descending direction.

14. Apparatus for feeding and stacking tiles, comprising in combination, a main frame having a first tile line feed means for positively feeding forward and retainably guiding a line of tiles, a second tile line feed means on the main frame for feeding off tiles one-by-one from the front end of the line of tiles at a faster rate than the line is moving and stacking them, a removable sub-assembly frame, elevator means for a stack of tiles fed from said line carried by said sub-assembly frame, means on said sub-assembly frame for holding a removable magazine for taking a stack of tiles on said elevator means, and a drive member carried by said sub-assembly which is positively engaged and driven by said line of tiles operatively connected to driven means on said removable sub-assembly, said means for feeding off tiles comprising a driven roll mounted on a swingable arm having associated means for holding the roll down in operative position, a forwardly removable tile guide of a length to extend from said feed-off roll back past said tile-driven elevator operating means, a positioning pin carried by said main frame cooperating with said main frame, said tile guide and said sub-assembly frame for selectvely holding them in position together or for freeing them for separation, said tile guide being removable when said pin is removed and said feed-out roll swung up, and said sub-assembly frame being removable when said pin and tile guide have been removed.

15. Apparatus as set forth in claim 14, wherein said pin is spring-pressed into engaging position and provided with a shoulder for pressing down the front end of said tile guide.

16. Apparatus for feeding and stacking tiles, comprising in combination, a main frame having a first tile line feed means for positively feeding forward and retainably guiding a line of tiles, a second tile line feed means on the main frame for feeding off tiles one-by-one from the front end of the line of tiles at a faster rate than the line is moving and stacking them, a removable sub-assembly frame, elevator means for a stack of tiles fed from said line carried by said sub-assembly frame, means on said sub-assembly frame for holding a removable magazine for taking a stack of tiles on said elevator means, and a drive member carried by said sub-assembly which is positively engaged with and driven by said line of tiles operatively connected to driven means on said removable sub-assembly, and means for halting the positive movement of the line of tiles to said tile-driven member at times to halt the operation of the member.

17. Apparatus as set forth in claim 16 in which means are provided for halting the positive feed movement when a predetermined number of tiles has been fed.

References Cited by the Examiner

UNITED STATES PATENTS

| | | | |
|---|---|---|---|
| 1,241,165 | 9/1917 | Swartz et al. | 53—245 |
| 1,490,350 | 4/1924 | Stroud | 53—245 XR |
| 1,964,084 | 6/1934 | Rundell | 53—245 |
| 2,683,557 | 7/1954 | Jenney | 53—162 XR |

TRAVIS S. McGEHEE, *Primary Examiner.*